(12) United States Patent
Shah et al.

(10) Patent No.: US 6,258,869 B1
(45) Date of Patent: Jul. 10, 2001

(54) PROCESS FOR PRODUCTION OF POLYOLS, AND POLYOLS FOR POLYURETHANE

(75) Inventors: Ashvin M. Shah, Mumbai (IN); Tilak M. Shah, Cary, NC (US)

(73) Assignee: Polymermann (Asia) Pvt. Ltd. (IN)

( * ) Notice: Subject to any disclaimer, the term of this patent is extended or adjusted under 35 U.S.C. 154(b) by 0 days.

(21) Appl. No.: 09/352,389

(22) Filed: Jul. 13, 1999

(51) Int. Cl.⁷ ..................................................... C08G 18/34
(52) U.S. Cl. ...................... 521/172; 252/182.24; 554/30; 554/174; 554/219; 521/173
(58) Field of Search .................... 252/182.24; 554/30, 554/174, 219; 521/172, 173

(56) References Cited

U.S. PATENT DOCUMENTS 3,714,091 * 1/1973 Lasher .

FOREIGN PATENT DOCUMENTS

2144467 * 9/1995 (CA) .
672697 * 9/1995 (EP) .
5814965 * 9/1983 (JP) .

OTHER PUBLICATIONS

Saunders & Frisch; Polyurethanes, Part I; pp. 52–53; 59, 1962.*

* cited by examiner

*Primary Examiner*—Rachel Gorr
(74) *Attorney, Agent, or Firm*—A. Jose Cortina; Kilpatrick Stockton LLP

(57) ABSTRACT

Polyols useful for preparing foamed polyurethane systems are produced by reacting a feed stock of agricultural origin with a multifunctional hydroxyl component in the presence of a catalytically effective amount of a catalyst suitable to polymerize the agricultural feed stock. The reaction may further include a di basic acid, such as phthalic or adipic acid, or a diol, DEG, or PEG. The resultant polyol is then purified and blended with other ingredients to produce a formulated polyol suitable for specific polyurethane foam systems. The polyols produced in accordance with the method are also described.

11 Claims, No Drawings

PROCESS FOR PRODUCTION OF POLYOLS, AND POLYOLS FOR POLYURETHANE

BACKGROUND OF THE INVENTION

The invention relates to a process for production of polyols for use in production of polyurethane foam systems. The invention also relates to the polyols, for example, polyester, produced by the process which are useful in the production of polyurethane foam. More specifically, the invention relates to the use of renewable agricultural resources such as vegetable oil, and more particularly castor oil, for the manufacture of polyester useful in production of foam polyurethane.

Most of the polyols (polyester/polyether) used for manufacture of polyurethane foams systems are based on petroleum feed stock. More specifically, current processes for preparation of polyols for foamed polyurethane involves propoxylation, ethoxylation and estrification of multifunctional hydroxyl (OH) precursors until a required hydroxyl (OH) value is achieved. The desired product is then purified to remove catalyst therefrom, as well as other undesirable components. Thus, as may be appreciated, polyols, in particular polyester and/or polyether are important reactants for the manufacturer of commercially useful polyurethane foams.

While presenting a useful source for the manufacture of such polyols, petroleum feed stock is generally considered nonrenewable and a source of feed stock which will eventually be depleted. Thus, in accordance with the invention, it becomes desirable to minimize the use of a nonrenewable feed stock such as petroleum. Further, current environmental considerations place great importance on the use of "green technologies", in particular, with respect to the use of such technologies for the manufacture of polyols useful in producing polyurethane foam. Thus, in accordance with the invention, the problems of using a nonrenewable feed stock such as a petroleum feed stock is avoided, by providing a method of manufacturing commercially useful polyols from renewable feed stock.

SUMMARY OF THE INVENTION

In accordance with one aspect of the invention, there is provided a process for the production of polyol for use in production of polyurethane foam. The process involves reacting under agitation a mixture of a predetermined quantity of agricultural feed stock in a ratio of about 100 parts, with a multifunctional hydroxyl component in a ratio of about 10 to about 200 parts. At least one di basic acid, or a mixture of di basic acids, such as adipic acid and phthalic acid or a diol, DEG, and PEG may also be added and reacted in the mixture in a ratio of up to about 100 parts. The reaction is conducted in the presence of a free radical catalyst suitable for estrification and polymerization, typically an alkali/alkaline earth/tin based catalyst, in an amount of about 0.01 percent to about 2 percent by weight of the mixture. The reaction is conducted at a temperature and for a time effective to result in a polyol useful for producing polyurethane foam.

In a more specific aspect, the feed stock is vegetable oil, or a mixture of vegetable oils, and more particularly castor oil. Castor oil is a nondrying oil extracted from the castor bean, which after processing, has previously been used as a lubricant among other applications. It is also known as ricinus oil. The reaction is preferably conducted at a temperature of about 150° C. to about 250° C. Yet more preferably, the reaction is conducted for a time period of about 6 hours to about 8 hours to result in different polyester polyols of 2 to 5 (hydroxyl) functionality. In conducting the reaction, preferably the hydroxyl component is a multifunctional hydroxyl component such as glycerin and sorbitol.

In another aspect, the invention is directed to a polyol for use in the production of polyurethane foam which is the product of the previously described reaction. More specifically, the polyol results from the reaction in which the feed stock is castor oil with the polyol resulting from having blended the reaction product with stabilizer catalyst and blowing agents to result in a polyol suitable for production of a predetermined polyurethane foam.

Having thus briefly described the invention, the same will become better understood from the following detailed discussion.

DETAILED DISCUSSION OF THE INVENTION

In accordance with the invention there is provided a process for manufacture of polyols which are useful for manufacturing polyurethane foam. Specifically, the process results in polyester polyols which are prepared from vegetable oils such as castor oil, or other ingredients mostly derived from agricultural sources.

The other vegetable oils considered are unsaturated oils like Soybean oil. Multifunctional hydroxyl components used as one of the reaction input are the substances like glycerin and sorbitol. A significant source of glycerin is from saponification vegetable oils like Palm oil, whereas Sorbitol is produced using sucrose as the starting material. Sucrose is fully derived from agricultural sources with multifunctional hydroxyl components to produce a polyester polyol of about 2 to about 5 (hydroxyl) finctionality useful for the manufacturer of polyurethane foam. For purposes of this disclosure, it is noted that OH refers to the hydroxyl number of the polyol. The functionality refers to the average number of hydroxyl groups per molecule of polyol and m.w. refers to the molecular weight of the polyol.

The polymer/polyols in accordance with the invention are produced by estrification/trans estrification of a polymerization known quantity of vegetable oil such as castor oil in a mixture with at least one multifunctional hydroxyl component, i.e., OH greater than 1, or a mixture thereof, and di basic acid. The previously mentioned materials are reacted under agitation at a temperature range of about 150° C. to about 250° C. in the presence of a catalytically effective amount of a conventional free radical catalyst known to be suitable for the polymerization of the unsaturated monomers in the oil. Specifically, such a catalyst can be an alkali/alkaline earth/tin based catalyst in an amount of anywhere from 0.01 to about 2 percent by weight. The reaction is conducted typically for a period of about 2 to about 8 hours to result in a polyol which can then be purified and standardized. More specifically, depending on the specific ratios, temperatures and time of reaction, different polyols of functionality of about 2 to about 5 (hydroxyl) value can be produced.

In a second step, depending on the desired polyurethane foam system to be prepared from the polyols, the polyols can be blended with appropriate ingredients such as a stabilizer catalyst, blowing agents, etc., to produce formulated polyols useful for achieving a desired performance of the polyurethane foam system to be produced. More specifically, the resultant polyols from the process of invention are typically polyesters which are used to produce foam polyurethane systems.

The invention also relates to the polyols produced with accordance with the process described herein.

EXAMPLES I–VII

A series of polymer/polyols were prepared in batch processes. Examples I–VII below describe the different types of polyols which result from conducting the process with varying constituents of the mixtures, and under varying temperature and time conditions to result in different polyols, i.e. polyesters.

Example I 400 gms. of Soybean oil is reacted with 100 gms. of Glycerin in a stirred glass reactor at a temperature of 200 to 245° C. for three hours in the presence of 0.1% of a tin catalyst. The reaction is carried out in a nitrogen atmosphere. The resulting product is a polyol of functionality of approximately 2 and has OH of 280 to 330 mgKOH/gm.

Example II 218.35 gms. of Castor oil is reacted with 281.35 gms. of a mixture of diols (PEG 600) in a stirred glass reactor at a temperature of 200 to 240° C. for three to four hours in the presence of 0.5% of alkaline earth catalyst. The reaction is carried out in a nitrogen atmosphere. The resulting product is a polyol of functionality of between 2 to 3 and has OH of 170 to 200 mgKOH/gm.

Example III 400 gms. of Castor oil is reacted with 100 gms. of glycerin in a stirred glass reactor at a temperature of 200 to 240° C. for three to four hours in the presence of 0.5 to 1% of an alkaline earth catalyst. The reaction is carried out in a nitrogen atmosphere. The product is purified by precipitating the catalyst chemically and filtering it off. The resulting product is a polyol has a functionality of approximately 3 and has OH of 410 to 450 mgKOH/gm.

Example IV 364 gms. of Castor oil is reacted with 135.88 gms. of a mixture of glycerin and sorbitol in a stirred glass reactor at a temperature of 200 to 250° C. for three to four hours in the presence of 1% of an alkaline earth catalyst. The reaction is carried out in a nitrogen atmosphere. The resulting product is a polyol, which is then purified by removing the catalyst chemically by precipitating the catalyst and filtering it off. The resulting polyol has a functionality of between 3 to 4 and OH of 380 to 400 mgKOH/gm.

Example V 240.6 gms of Castor oil is reacted with 164.1 gms. of a mixture of glycerin using 0.5% of the tin catalyst in a stirred glass reactor at a temperature of 200 to 250° C. for one to two hours. After two hours, 95.3 gms. of Phthalic acid is added and reaction proceeds at 180° C. for the next two hours. Thereafter, the reaction temperature is increased to 220° C. for another two hours to complete the reaction. The reaction is carried out under nitrogen initially, and a vacuum is applied during the last half hour to complete the reaction and to bring the acid value to less than one. The resulting product is a polyol having a functionality of between 4 to 5 and having OH of 470 to 490 mgKOH/gm.

Example VI 146.8 gms. of Castor oil is reacted with 69.29 gms. of a mixture of Adipic and Phthalic acid in a stirred glass reactor at a temperature of 200 to 250° C. for about four hours. Thereafter, 283.9 gms. of PEG 600 is added and reaction proceeds further using 0.1% of a tin catalyst at 180° C. to 230° C. for the next 10 to 12 hours. The reaction is carried out under nitrogen initially and vacuum is applied during last three hour to complete the reaction and to bring the acid value less than one. The resulting product is a polyol with a functionality of approximately 3 and having OH of 30 to 50.

Example VII 134.7 gms. of Castor oil is reacted with 211.74 gms. of a mixture of Adipic and Phthalic acid in a stirred glass reactor at a temperature of 200 to 250° C. for about four hours. Thereafter, 153.55 gms. of DEG is added and reaction proceeds further using 0.1% of tin catalyst at 180° C. to 220° C. for next 10 to 12 hours. The reaction is carried out under nitrogen initially and a vacuum is applied during the last three hours to complete the reaction and to bring the acid value to less than one. The resulting product is a polyol with a functionality of between 2 to 3 and having OH of 30 to 45 mgKOH/gm.

Having thus generally described the invention, the same will become better understood from the following claims in which it is set forth in a nonlimiting manner.

What is claimed is:

1. A process for the production of polyol for use in production of polyurethane foam, comprising reacting under agitation:

a mixture of a predetermined quantity of agricultural origin feed stock in a ratio of about 100 parts, with a multifunctional hydroxyl component in a ratio of about 10 to about 200 parts;

said reaction being conducted in the presence of a tin based catalyst suitable for polymerization in an amount of about 0.01 percent to about 2 percent by weight of the mixture; and said reaction conducted at a temperature of about 150° C. to about 250° C. and for a time effective to result in a polyol having an OH of between 30 and 490 mgKOH/gm useful for producing polyurethane foam.

2. The process of claim 1, wherein said mixture further comprises at least one of a diol, DEG, and PEG in a ratio of about 100 parts of the mixture.

3. The process of claim 1, wherein said mixture further comprises a di basic acid in a ratio of about 100 parts of the mixture.

4. The process of claim 3, wherein said di basic acid futher comprises phthalic and adipic acid.

5. The process of claim 1, wherein said feed stock is at least one vegetable oil.

6. The process of claim 5, wherein said vegetable oil includes castor oil.

7. The process of claim 1, wherein said hydroxyl component comprises glycerin.

8. The process of claim 1, further comprising conducting said reaction at a temperature and for a time effective to result in a polyester polyol of about 2 to about 5 (hydroxyl) functionality.

9. The process of claim 1, further comprising conducting said reaction for a time period of about 6 to 8 hours.

10. The process of claim 1, further comprising blending the resultant polyol with stabilizer, catalyst and blowing agents to result in a polyol suitable for production of a predetermined polyurethane foam.

11. The process claim 10, further comprising purifying the resultant polyol before conducting said blending with stabilizer catalyst and blowing agents.

* * * * *

UNITED STATES PATENT AND TRADEMARK OFFICE
CERTIFICATE OF CORRECTION

PATENT NO. : 6,258,869 B1 Page 1 of 1
DATED : July 10, 2001
INVENTOR(S) : Ashvin M. Shah and Tilak M. Shah It is certified that error appears in the above-identified patent and that said Letters Patent is hereby corrected as shown below:

Column 4,
Line 6, after "having OH of 30 to 50" insert -- mgKOH/gm --.

Signed and Sealed this

Eighth Day of January, 2002

Attest:

JAMES E. ROGAN
Attesting Officer    Director of the United States Patent and Trademark Office